(12) United States Patent
Brent

(10) Patent No.: US 6,608,822 B1
(45) Date of Patent: Aug. 19, 2003

(54) DIRECT PATH MATRIX CONFERENCE COMMUNICATION SYSTEM AND METHOD

(75) Inventor: Kenneth Wayne Brent, Miami, FL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/170,396

(22) Filed: Oct. 13, 1998

(51) Int. Cl.[7] .............................. H04L 12/66; H04Q 7/20
(52) U.S. Cl. ..................... 370/329; 370/466; 370/470
(58) Field of Search .................... 370/329, 330, 370/465, 466, 469, 470

(56) References Cited

U.S. PATENT DOCUMENTS

| | | | |
|---|---|---|---|
| 5,513,181 A | * | 4/1996 | Bresalier et al. ............ 370/465 |
| 6,178,170 B1 | * | 1/2001 | Duree et al. ........... 370/395.61 |
| 6,278,697 B1 | * | 8/2001 | Brody et al. ................ 370/310 |

* cited by examiner

Primary Examiner—Melvin Marcelo

(57) ABSTRACT

A system and method for directly converting encoded speech-frames in a conference environment communication system which has a transmitting unit that transmits an input signal of an input modulation type, a plurality of receiving units that each receive an output signal of an output modulation type and a direct interface system that directly interfaces the input signal to the plurality of output signals.

104 Claims, 7 Drawing Sheets

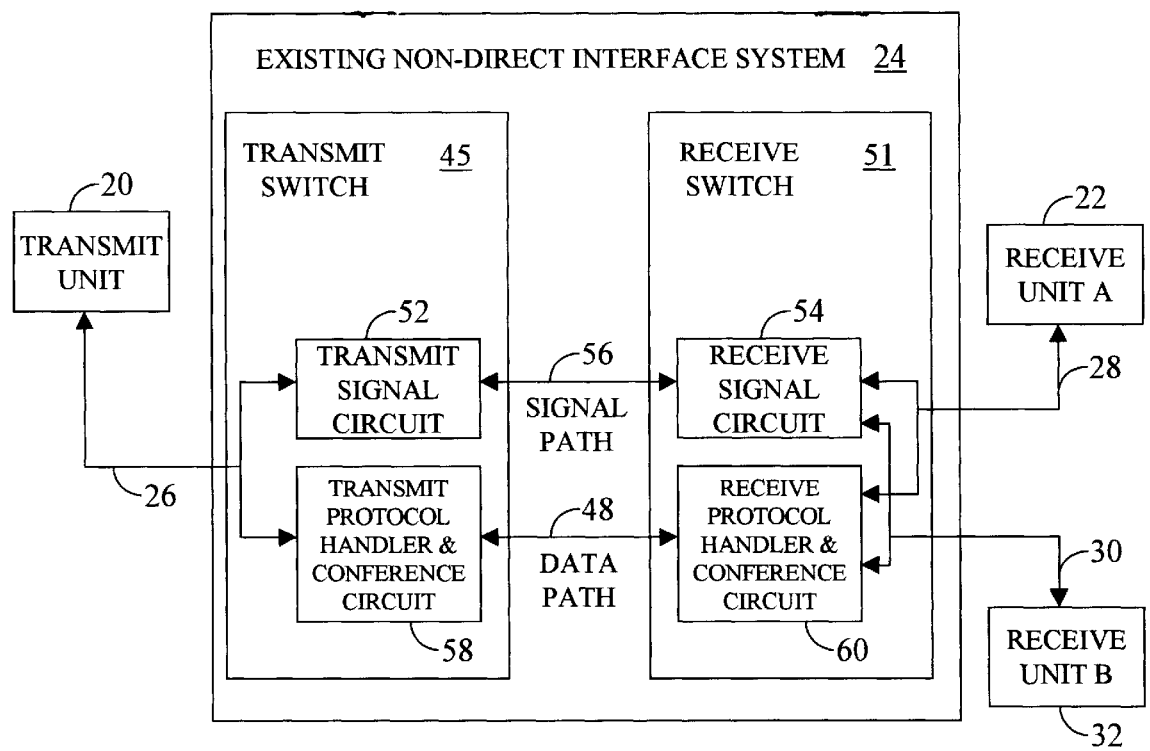
FIG. 4 - PRIOR ART
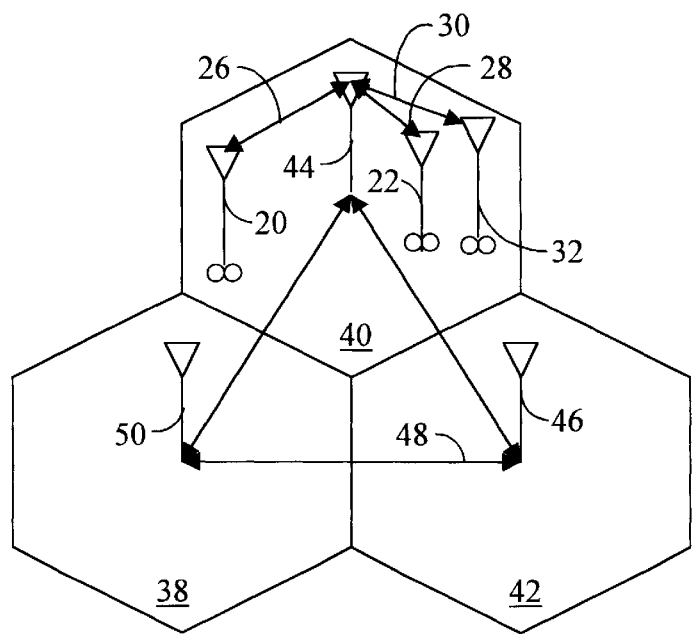
FIG. 5 - PRIOR ART

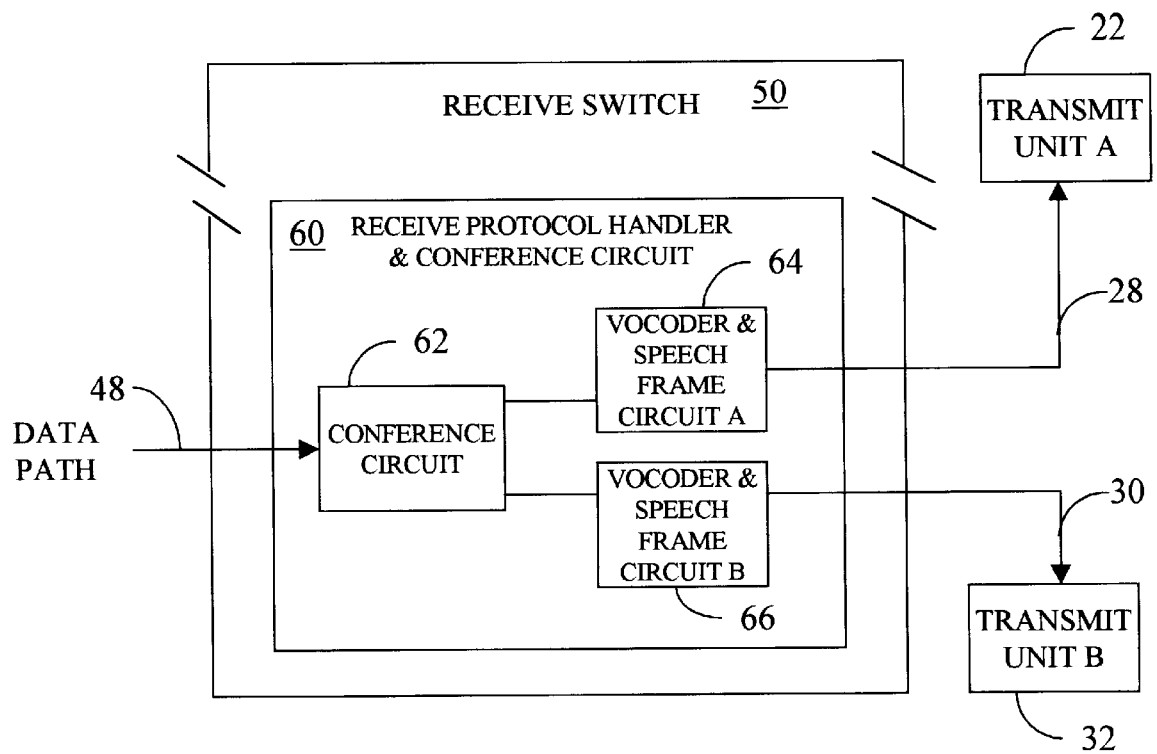
FIG. 6 - PRIOR ART
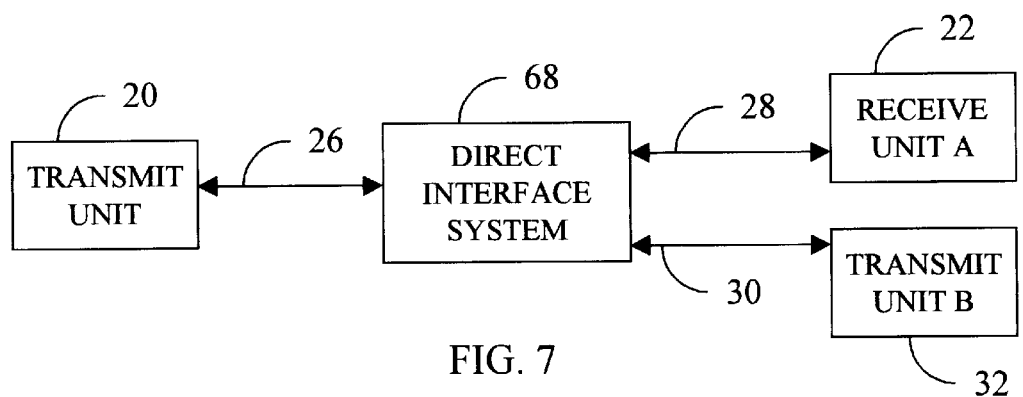
FIG. 7

DIRECT PATH MATRIX CONFERENCE COMMUNICATION SYSTEM AND METHOD

BACKGROUND OF THE INVENTION

The present invention relates generally to the field of communication systems more particularly to wireless communication systems.

As wireless communication systems become more common, the emphasis in wireless communications is to provide feature rich services in a mobile environment. Mobile-to-Mobile calling patterns involving multiple party conferencing are expected to increase exponentially as more subscribers are added to wireless services.

This produces a need for a network infrastructure that supports both the existing connectivity paths and those new connectivity paths required to support a substantially higher mobile-to-mobile multiple party conferencing traffic percentage. Presently, wireless network infrastructures have an inherent need to convert between radio frequency (RF) encoded speech of a mobile and the 64 kilobit per second (kb) pulse code modulation (PCM) based telephony infrastructure of existing switching equipment. The exact process occurs in the reverse direction requiring the conversion of 64 kb PCM into RF encoded speech-frames. This conversion occurs multiple times in a mobile-to-mobile call scenario. Thus, conversion delay is introduced into the end-to-end path and quantization noise is increased that is highly noticeable to the mobile users. Both are highly noticeable to the mobile users.

Additionally, with any conferencing situation it is inherent that the connection of at least two mobiles multiple conversions between 64 kb PCM and encoded speech are encountered. The 64 kb PCM is directed through the network infrastructure to a three or six port conferencing circuit which takes incoming sample streams, aggregates, averages, and generates outgoing sample streams. The mobile's encoded speech is converted, sent to the conferencing circuits, sent back, and then reconverting into encoded speech. Thus, additional delay beyond what is encountered for sample conversion is introduced into the end-to-end path and this is highly noticeable to the mobile users.

Additionally, new hardware is required because the wireless infrastructure requires additional trunk resources to connect both ends of the mobile-to-mobile call. Thus, a need exists for network infrastructures that support existing connectivity paths and provide new connectivity paths to support a higher mobile-to-mobile traffic percentage.

SUMMARY OF THE INVENTION

In accordance with the present invention, the problem of multiply converting the RF modulated encoded speech-frames, received from the transmit unit, into an intermediate 64 kb PCM and then back to RF modulated encoded speech-frames for transmission multiple receive units in a conference call environment is overcome by using an interface conference circuit that is programmable and has a matrix component that allows similar encoded speech-frame streams to cross-connect and differently encoded speech-frame streams to be cross-converted without any intermediate steps.

An example system of the invention includes a transmit unit that transmits an input signal of an input modulation encoded speech-frame type, a number of receive units that each receive an output signal of an output modulation encoded speech-frame type and a direct interface system that directly interfaces the input signal to each of the output signals.

The direct interface system includes a transmit conference interface circuit that directly interfaces the input signal to a data path signal and a receive interface conference circuit that directly interfaces the data path signal to each of the output signals.

The transmit conference interface circuit includes both a plurality of input modulation encoded speech-frame types and a plurality of output modulation encoded speech-frame types. One of the input modulation encoded speech-frame types represents the encoded speech-frame type of input signal and one of the output modulation encoded speech-frame types represents the encoded speech-frame type of each of output signal. Additionally, the transmit conference interface circuit include an interface conference matrix that directly interfaces the encoded speech-frame type of the input signal to the encoded speech-frame type of each of the output signals.

BRIEF DESCRIPTION OF THE DRAWINGS

The foregoing advantageous features of the invention will be described in detail and other advantageous features will be made apparent upon reading the following detailed description that is given with reference to the several figures of the drawings, in which:

FIG. 4 is another functional block diagram showing a prior art existing non-direct interface system functional block of FIG. 1;

FIG. 5 is a graphical representation of three cell sites within the mobile telecommunication system of FIG. 1 where the transmit and receive units are located in the same cell;

FIG. 6 is another functional block diagram showing a prior art receive protocol handler and conference circuit function block of FIG. 4;

FIG. 7 is a function block diagram of the system of the invention;

DETAILED DESCRIPTION

Figure 1:
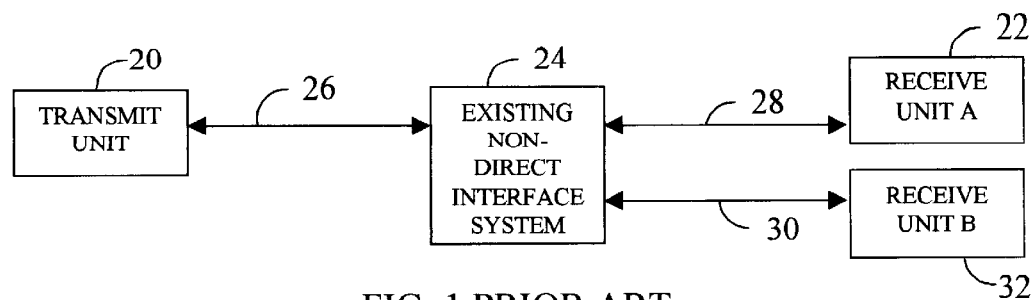
FIG. 1 is a functional block diagram of a prior art telecommunication system in a conference environment.

Referring to FIG. 1, an existing telecommunication system in a conference environment is shown. A transmit unit 20 sends and receives communication data (such as voice, digital data, and facsimile) to a receive unit A 22 and receive unit B 32 through an existing non-direct interface system 24. The system allows two way communication between the transmit unit 20, receive unit A 22 and the receive unit B 32 by working identically in both directions. In one direction, the transmit unit 20 sends communication data via an input signal 26 to the existing non-direct interface system 24 which processes and routes the data via an output signal A 28 to the receive unit A 22 and an output signal B 30 to the receive unit B 32. In the other direction, the receive unit A 22 or receive unit B 32 send communication data via the output signal A 28 and output signal B 30 to the existing non-direct interface system 24 which processes and routes the data via the input signal 26 to a transmit unit 20.

The transmit unit 20, receive unit A 22 and receive unit B 32 are either mobile terminals (also known as mobile stations), such as cellular telephones or radio units, or non-mobile terminals such as conventional land-line telephones.

Figure 2:
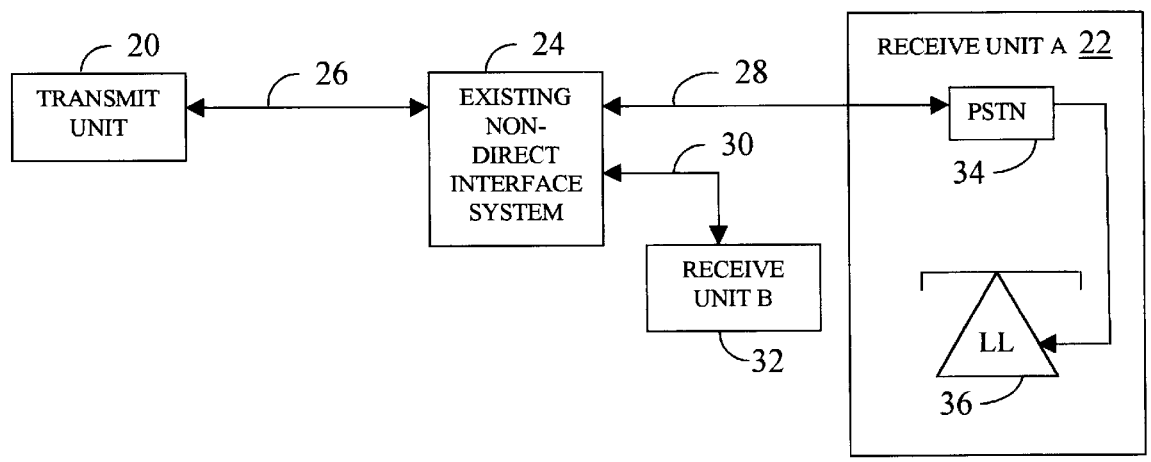
FIG. 2 is another function block diagram of the prior art telecommunication system in FIG. 1 showing a receive unit as land-line communication.

In FIG. 2, the transmit unit 20 and the receive unit B 32 are shown to be mobile terminals and the receive unit A 22 is shown as a conventional land line telephone. In one direction, the transmit unit 20 transmits communication data via the input signal 26 to the existing non-direct interface system 24 which processes and routes the data via the output signal A 28 to the receive unit A 22 and the output signal 30 to the receive unit B 32. At the receive unit A 22, the output signal A 28 is transmitted to a land-line telephone 36 via a private switch telephone network 34. In the other direction, the land-line telephone 36 transmits communication data via the output signal 28 and private switched telephone network 34 to the existing non-direct interface system 24 which processes and routes the data via the input data 26 to the receive unit 20.

In this example, the transmit unit 20 and receive unit B 32 transmit and receive communication data to the existing non-direct interface system 24 via radio waves, while the land-line telephone 36 transmits and receives communication data via a direct non-radio fashion. The transmit unit 20 and receive unit B 32 transmit RF input signal 26 and RF output signal B 30 with varying types of encoded speech-frame modulation types based on the requirements of the communication system. The land-line telephone typically uses 64 kb PCM based on the telephony infrastructure of existing switching equipment.

Figure 3:
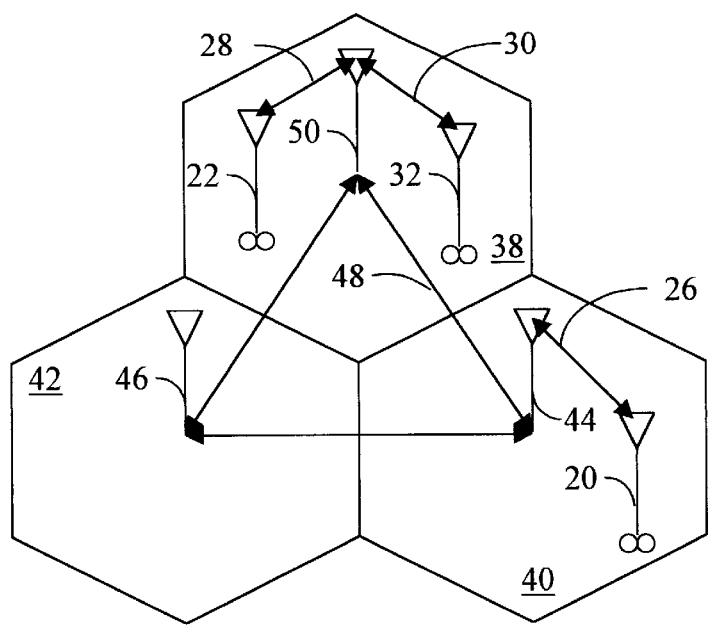
FIG. 3 is a graphical representation of three cell sites within the mobile telecommunication system of FIG. 1 where the transmit and receive units are located in different cells.

In FIG. 3, the transmit unit 20, receive unit A 22 and receive unit B 32 are shown as mobile terminals within the current mobile telecommunication system consisting of a plurality of cells 38, 40 and 42. Consistent with convention, each cell 38, 40 and 42 is shown having a hexagonal cell boundary. Within each cell 38, 40 and 42 are base stations 44, 46 and 50 that are located near the center of the corresponding cell 38, 40 and 42. Specifically, the base station 44 is located within cell 40, base station 46 is located within cell 32, and base station 50 is located within cell 38. The base stations 44, 46 and 50 are part of the existing non-direct interface system 24 and transmit and receive communication data to each other via a data path 48.

As an example, the transmit unit 20 is located within cell 40 and the receive unit A 22 and receive unit B 32 are located with cell 38. Base stations 44, 46 and 50 transmit and receive communication data with any mobile terminal located within their respective cells. The transmit unit 20 communicates with the base station 44 via the RF input data signal 26 inside cell 40, the receive unit A 22 communicates with the base station 50 via the RF output data signal A 28 inside of cell 38 and the receive unit B 32 communicates with the base station 50 via the RF output data signal B 30 inside of cell 38.

FIG. 4 is a functional block diagram for the existing non-direct interface system 24 of FIG. 1. The existing non-direct interface system 24 contains numerous telecommunication switches corresponding to the different base stations for the different cells in the telecommunication system. As an example, the existing non-direct interface system 24 is shown to have at least two switches because the two mobile terminals corresponding to the transmit unit 20, in cell 40 in FIG. 3, and the receive unit A 22 and receive unit B 32, in cell 38 in FIG. 3, are in different cells. The first switch (transmit switch 45) corresponds to the base station 44 in FIG. 3 and the second switch (receive switch 51) corresponds to the base station 50 in FIG. 3:

The transmit switch 45 contains a transmit signal circuit 52 and a transmit protocol handler and conference circuit 58. The receive switch 51 contains a receive signal circuit 54 and receive protocol handler and conference circuit 60. The transmit unit 20 communicates with the receive unit A 22 and the receive unit B 32 through the combination of the transmit switch 45 and receive switch 51.

The transmit unit 20 attempts to communicate with receive unit A 22 by transmitting the input signal 26 to the transmit switch 45. The input signal 26 is of a given RF modulation encoded speech-frame type. When the input signal 26 is received by the transmit switch 45, the transmit switch 45 determines the encoded speech-frame type of the input signal 26 and sets the transmit protocol handler and conference circuit 58 to convert the encoded speech-frame type of the input signal 26 to a standard 64 kb PCM type for the data path 48. The transmit switch 45, with the transmit signal circuit 52, also determines from the input data 26 an identification request from the transmit unit 20. The identification request is a request from the transmit unit 20 to the transmit switch 45 to communicate with the receive unit A 22. The identification request contains identifying information for the receive unit A 22 such as the cellular telephone number.

The transmit signal circuit 52 sends the identification request via a signal path 56 to a receive signal circuit 54 in the receive switch 51. When the receive signal circuit 54 receives the identification request, the receive signal circuit 54 attempts to establish a connection with the receive unit A 22. If the receive unit A 22 fails to respond, the receive signal circuit 54 returns a unit not responding message via the signal path 56 to the transmit signal circuit 52 which forwards the message to the transmit unit 20 and stops communication.

If the receive unit A 22 does respond, the receive signal circuit 54 determines the receive unit A's 22 encoded speech-frame type and the receive protocol handler and conference circuit 60 corresponding adjusts itself to convert the 64 kb PCM data path 48 to the encoded speech-frame type of the receive unit A 22. The receive signal circuit 54 then sends a message via the signal path 56 to the transmit signal circuit 52 to start communication. The transmit protocol handler and conference circuit 58 then converts the transmit unit A's 20 encoded speech-frame type input signal 26 to the 64 kb PCM data path signal 48 and sends it to the receive protocol handler and conference circuit 60 which converts the 64 kb PCM data signal 48 to the receive unit A's 22 encoded speech-frame output signal 28. The receive switch 51 then transmits the output signal A 28 to the receive unit A 22.

Communication from the transmit unit 20 to the receive unit B 32 is identical to communication to the receive unit A 32. Additionally, when the transmit unit 20 communicates with both receive unit A 22 and receive unit B 32 simultaneously a conference call is established by the receive protocol handler and conference circuit 60 that allows for two way communication between all the units.

Communication in the opposite direction from the receive unit A 22, or receive unit B 32, to the transmit unit 20 is identical because the existing non-direct interface system 24 is a complete two way communication system. The transmit switch 45 and the receive switch 51 operate in the same way.

FIG. 5 shows the situation when the transmit unit 20, the receive unit A 22 and the receive unit B 32 are all mobile terminals in the same cell 40. In this case all the units communicate with only the base station 44. There is only one switch involved in the communication path between the transmit unit 20, the receive unit A 22 and the receive unit B 32.

Thus in FIG. 4, the transmit switch 45 and the receive switch 51 are the same switch and the signal path 56 and the data path 48 travel in a loop. The operation of the existing non-direct interface system 24 is the same as in the case of the mobile terminals being in different cells because the transmit switch 45 has the capability of communicating with multiple transmit terminals and operating as both the transmit switch 45 and the receive switch 51.

In FIG. 6 a conference circuit 62, a voice encoder (vocoder) speech frame circuit A 64 and a vocoder speech frame circuit B 66 are shown within the receive protocol handler and conference circuit 60. The conference circuit 62 allows multiple transmit units, such as the receive unit A 22 and the receive unit B 30, to communicate simultaneously in a conference call with the transmit unit 20.

The vocoder and speech frame circuits A 64 and B 66 contain speech encoders that translate between the encoded-speech frames for transport across the RF environment, such as the output signals A 28 and B 30, to the 64 Kb PCM used for the data path 48. The vocoder and speech frame circuits A 64 and B 66 also determine the encoded speech-frame types for the output signals A 28 and B 30. The transmit protocol handler and conference circuit 58 operates in the same way as the receive protocol handler and conference circuit 60.

FIG. 7 shows a new telecommunication system incorporating the invention. The transmit unit 20 sends and receives communication data to a receive unit A 22 and a receive unit B 32 through a direct interface system 68. The system allows two way communication between the transmit unit 20, the receive unit A 22 and receive unit B 32 by working identically in both directions. In one direction, the transmit unit 20 sends communication data via the input signal 26 to the direct interface system 68 which processes and routes the data via the output signal A 28 to the receive unit A 22 or via the output signal B 30 to the receive unit B 32. In the other direction, the receive unit A 22 or B 32 sends communication data via the output signal A 28 or B 30 to the direct interface system 68 which processes and routes the data via the input signal 26 to a transmit unit 20. The transmit unit 20, the receive unit A 22 or receive unit B 32 are either mobile terminals or non-mobile terminals.

Figure 8:
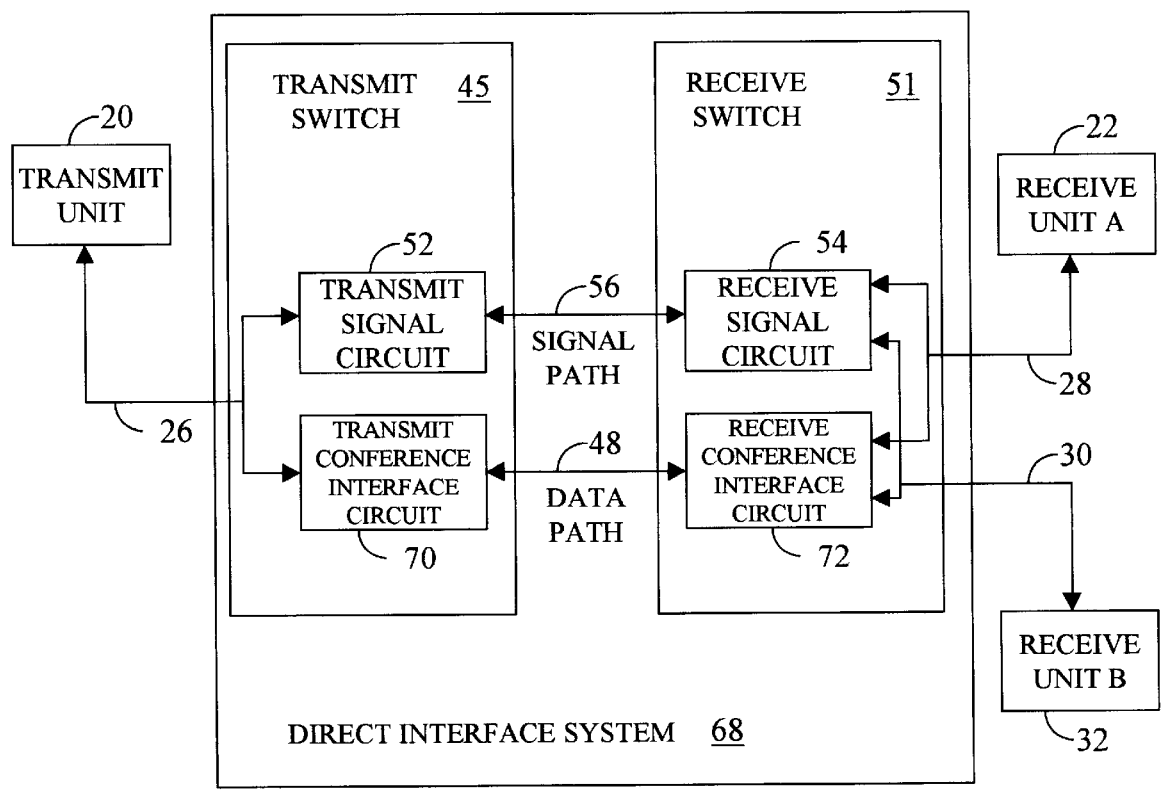
FIG. 8 is another functional block diagram showing the preferred form of the direct interface system functional block in FIG. 3.

In FIG. 8, the direct interface system 68 is shown in greater detail. Similar to the existing non-direct interface system-24, the direct interface system 68 contains numerous telecommunication switches corresponding to the different base stations for the different cells in the telecommunication system. If the mobile terminals are in the same cell the transmit switch 45 and the receive switch 51 are the same switch corresponding to the base station of the given cell.

As an example, the direct interface system 68 is shown to have at least two switches because the three mobile terminals corresponding to the transmit unit 20, in cell 40 in FIG. 3, the receive unit A 22 and receive unit B 32, both in cell 38 in FIG. 3, are in different cells. The first switch, the transmit switch 45, corresponds to the base station 44 in FIG. 3 and the second switch, the receive switch 51, corresponds to the base station 50 in FIG. 3.

The transmit switch 45 contains a transmit signal circuit 52 and a transmit conference interface circuit 70. The receive switch 51 contains a receive signal circuit 54 and receive interface conference circuit 72. The transmit unit 20 communicates with both the receive unit A 22 and receive unit B 32 through the combination of the transmit switch 45 and receive switch 51.

The transmit unit 20 attempts to communicate with receive unit A 22 by transmitting the input signal 26 to the transmit switch 45. The input signal 26 is of a given RF modulation encoded speech-frame type. When the input signal 26 is received by the transmit switch 45, the transmit switch 45 determines the encoded speech-frame type of the input signal 26 and sets the transmit conference interface circuit 70 to accept the encoded speech-frame type of the input signal 26 in a pass through mode. The transmit switch 45, with the transmit signal circuit 52, also determines from the input data 26 the identification request from the transmit unit 20.

The transmit signal circuit 52 sends an identification request via the signal path 56 to the receive signal circuit 54 in the receive switch 51. When the receive signal circuit 54 receives the identification request, the receive signal circuit 54 attempts to establish a connection with the receive unit A 22. If the receive unit A 22 fails to respond, the receive signal circuit 54 returns a unit not responding message via the signal path 56 to the transmit signal circuit 52 which forwards the message to the transmit unit 20 and stops communication.

If the receive unit A 22 does respond, the receive signal circuit 54 determines the receive unit A's 22 encoded speech-frame type, sets the receive conference interface circuit 72 to convert the transmit unit's 20 encoded speech-frame type to the receive unit A's 22 encoded speech-frame type without going through an intermediate conversion to PCM modulation.

After the receive conference interface circuit 72 is set, the signal circuit 54 sends a message, via the signal path 56, to the transmit signal circuit 52 to start communication. The transmit conference interface circuit 70 then passes the transmit unit's 20 encoded speech-frame input signal 26 and sends the data, via the data path 48, to the receive conference interface circuit 72 which is converts the transmit unit's 20 encoded speech-frame data to the receive unit A's 22 encoded speech-frame data.

Communication from the transmit unit 20 to the receive unit B 32 is identical to communication to the receive unit A 32. Additionally, when the transmit unit 20 communicates with both receive unit A 22 and receive unit B 32 simultaneously a conference call is established by the receive conference interface circuit 72 that allows for two way communication between all the units.

Communication in the opposite direction from the receive unit 22 to the transmit unit 20 is identical because the direct interface system 68 is a complete two way communication system. The transmit switch 45 and the receive switch 51 operate in the same way.

Figure 9:
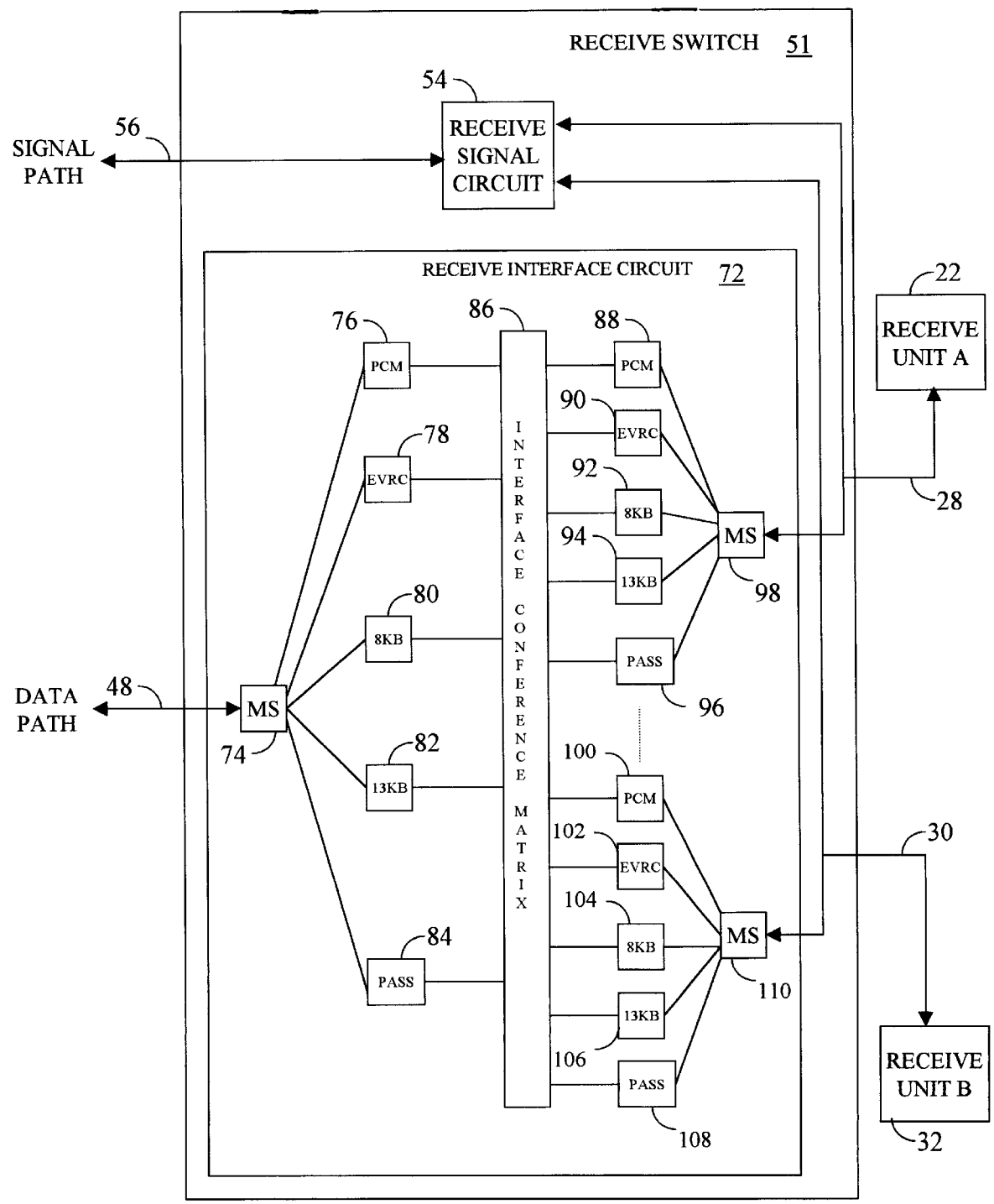
FIG. 9 is detailed functional block diagram showing the preferred form of the receive interface circuit functional blocks in FIG. 8.

Referring to FIG. 9, the receive conference interface circuit 72 of FIG. 8 is shown in greater detail. The receive conference interface circuit 72 contains an interface matrix 86 which, if the input and output encodings are different, cross-converts a set of input encoded speech-frame types 76, 78, 80 and 82 to a corresponding set of output encoded speech-frame types 88, 90, 92 and 94, for receive unit A 22, and 100, 102, 104 and 106, for receive unit B 32. If the input and output encodings are similar, the receive conference interface circuit 72 is set to a pass through mode and cross-connects, with no conversion, the input, the output signal A and output signal B via pass connections 84, 96 and 108.

Similarly, the transmit conference interface circuit 70, of FIG. 8, also contains an interface matrix which cross-converts a set of input encoded speech-frame types to a corresponding set of output encoded speech-frame types if the input and output encodings are different. If the input and output encodings are similar, the transmit conference interface circuit 70, of FIG. 8, is set to the pass through mode and cross-connects the input and output signal via pass through connections.

The encoded speech-frame types are numerous because the invention works equally well with time division multiple access (TDMA), code division multiple access (CDMA) or other similar digital encoding schemes. For example purposes a CDMA type system is shown, the encoding speech frame types have been chosen to be either enhanced variable rate coding (EVRC) (78, 90 and 102), eight-kilobit code excited linear prediction (8 kb) (80, 92 and 104), thirteen kilobit code excited linear prediction (13 kb) (82, 94 and 106) and PCM (76, 88 and 100). Note that other combinations and types of encoded speech-frames could be used without modifying the invention. The choice for the example is based on the encoded speech-frame types used in existing telecommunication systems in the United States.

When the transmit unit 20, FIG. 8, attempts to communicate with the receive unit A 22 or the receive unit B 32 by transmitting the input signal 26 to the transmit switch 45. The transmit switch 45 determines the encoded speech-frame type of the input signal 26 and sends the information to the receive signal circuit 54, via the signal path 56. The receive switch 51 sets a matrix selector (MS) 74 located in the receive conference interface circuit 72 to receive a data path signal 48 with has an encoded speech-frame type corresponding to the transmit unit 20. The MS circuit 74 sets the interface matrix 86 to accept one of the encoded speech-frame input types 76, 78, 80 and 82 that corresponds to the encoded speech-frame type of the data path signal-48.

The receive switch 51, with the receive signal circuit 54, then determines from the signal data 56 the identification request from the transmit unit 20. When the receive signal circuit 54 receives the communication request, the receive signal circuit 54 attempts to establish a connection with the receive unit A 22. If the receive unit A 22 does respond, the receive signal circuit 54 determines the receive unit A's 22 encoded speech-frame type, sets the receive conference interface circuit 72 to convert from the data path signal's 48 encoded speech-frame type to the receive unit A's 22 encoded speech-frame type.

To convert from the data path signal's 48 encoded speech-frame type to the receive unit A's 22 encoded speech-frame type, the second MS circuit 98 sets the interface matrix 86 to select one of the output encoded speech-frame types 88, 90, 92 and 94 that corresponds to the receive unit A's 22 encoded speech-frame type.

If the transmit unit's 20 encoded speech-frame type is different than the receive unit A's 22 encoded speech-frame, the interface matrix 86 then cross-converts the transmit unit's 20 encoded speech-frame type directly to the receive unit A's 22 encoded speech-frame type without going through an intermediate conversion to PCM. If the transmit unit's 20 encoded speech-frame type is similar to the receive unit A's 22 encoded speech-frame, the interface matrix 86 sets itself in the pass through mode and cross-connects the transmit unit's 20 encoded speech-frame type directly to the receive unit A's 22 encoded speech-frame type any processing. The receive switch 51 then transmits the output signal 28 to the receive unit A 22.

Communication from the transmit unit 20 to the receive unit B 32 is identical to communication to the receive unit A-32. Additionally, when the transmit unit 20 communicates with both receive unit A 22 and receive unit B 32 simultaneously a conference call is established by the receive conference interface circuit 72 that allows for two way communication between all the units.

In the case of a conference call, the interface conference matrix 86 converts the transmit unit's 20 encoded speech-frame type to both the receive unit A 22 and receive unit B 32 encoded speech-frame types. The user at the transmit unit 20 initiates the conference call by first initiating a call to receive unit A 22 and then sending a conference initiation request to the transmit switch 45. Typically, the user sends a conference initiation request by pushing the flash button on a standard telephone or cellular telephone. After the conference initiation request is received by the transmit switch 45, the transmit unit 20 sends an identification request for the receive unit B 32. Once the transmit switch 45 receives the identification request for receive unit B 32 it proceeds to establish a call to receive unit B 32 in the same way that it established the original call to receive unit A 22.

In this case the interface conference matrix 86 responds to the conversion requests from both the second MS circuit 98, corresponding to the receive unit A 22, and a third MS circuit 110 corresponding to the receive unit B 32. The second MS circuit 98 determines which output encoding speech-frames types 88, 90, 92 or 94 corresponded to the receive unit A's 22 encoding type and the third MS circuit 110 determines which output encoding speech-frame types 100, 102, 104 and 106 correspond to the receive unit B's 32 encoding type. The interface conference matrix 86 then simultaneously converts from the transmit unit's 20 encoded speech-frame type to the receive unit A's 22 and receive unit B's 32 encoded speech-frame types.

Note that only two receive units and one transmit unit have been shown for example purposes. The invention works equally well with additional receive and transmit units.

Within the interface conference matrix 86 the information from the transmit unit 20, the receive unit A 22, and the receive unit B 32 are combined in a digital wave to average the total signal information. This average is then transmitted to all the units. Users at each of the units receive the same average of the total signal information which allows them to each hear the same information in a conference call situation.

Communication in the opposite direction from the receive unit A 22 or B 32 to the transmit unit 20 is identical because the direct interface system 68 is a complete two way communication system. The transmit switch 45 and the receive switch 51 operate in the same way. Thus, it is possible to have multiple transmit units involved in a conference call in addition to the receive units.

Figure 10:
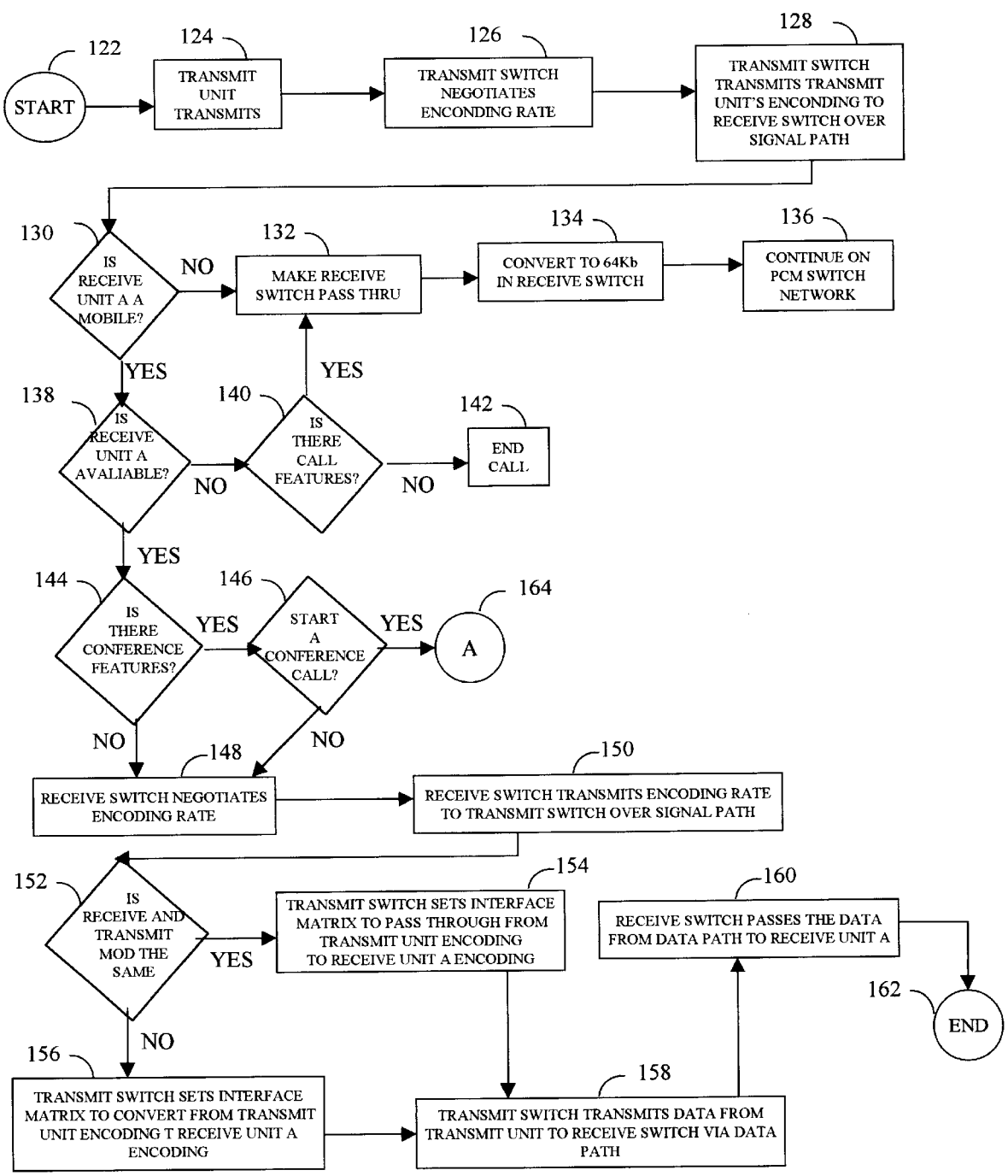
FIG. 10 is part of a composite logic flow chart that shows the preferred process steps preformed by the system of FIG. 7.

In FIG. 10, a composite logic flow chart shows the preferred process steps preformed by the system of FIG. 7. In process starts at 122. In step 124, the transmit unit 20 of FIG. 8 transmits an input data signal 26. The transmit switch 45 of FIG. 8 negotiates the encoding rate of the input signal 26 of FIG. 8 in step 126. In step 128, the transmit switch 45 of FIG. 8 transmits the transmit unit's 20 encoding speech-frame type via the signal path 56 of FIG. 8 to the receive switch 51 of FIG. 8.

The process then determines if the receive unit A 22 of FIG. 8 is a mobile unit indecision step 130. If the receive unit A 22 of FIG. 8 is not a mobile unit the process recognizes that it will be communicating with a land-line telephone and sets the receive conference interface circuit 72 of FIG. 8 to the pass through mode in step 132 and continues to step 134. In step 134, the transmit conference interface circuit 70 cross-converts the transmit unit's 20 encoded speech-frame type to 64 kb PCM. In step 136, the transmit switch 45 sends the information to the private switched telephone network 34 of FIG. 2.

If the receive unit A 22 is a mobile unit in decision step 130, the process instead continues to decision step 138. In decision step 138, the process determines if the receive unit A 22 is avaliable. If the answer is no, the process continues to decision step 140. In decision step 140, the process checks to see if the receive unit A 22 has call features such as voice mail. If no, the process ends in step 142. If yes, the process recognizes that it will be communicating with a land-line call center and sets the receive conference interface circuit 72 of FIG. 8 to the pass through mode in step 132 and continues to step 134. In step 134, the transmit conference interface circuit 70 cross-converts the transmit unit's 20 encoded speech-frame type to 64 kb PCM. In step 136, the transmit switch 45 sends the call to a voice messaging system.

If the answer to decision step 138 is yes, the process continues instead to step 144. In step 144, the process determines if the transmit unit 20 has conference call features. If yes, the process continues to decision step 146. In decision step 146, the process determines if the transmit unit 20 has requested a conference call. If yes, the process continues to flow point 164 which begins the conference call processing described in FIG. 11. If the response to decision step 146 is no, the process instead continues to step 148.

If the answer to decision step 144 is no, the process continues to step 148. In step 148, the receive switch 51 of FIG. 8 determines the receive unit A's 22 of FIG. 8 encoded speech-frame type. Then the receive switch 51 of FIG. 8, in step 150, transmits the receive unit A's 22 of FIG. 8 encoded speech-frame type over the signal path 56 of FIG. 8 to the transmit switch 45 of FIG. 8 and the process continues to decision step 152.

In decision step 152, the transmit switch 45 determines whether the transmit unit's 20 of FIG. 8 encoded speech-frame type is similar to the receive unit A's 22 of FIG. 8 encoded speech-frame type. If yes, the process continues to step 154. In step 154, the transmit switch 45 of FIG. 8 sets the interface conference matrix to cross-connect from the transmit unit's 20 of FIG. 8 encoded speech-frame type to the receive unit A's 22 of FIG. 8 encoded speech frame type and the process continues to step 158.

If the answer to decision step 152 is no, the process instead continues to step 156. In step 156, the transmit switch 45 of FIG. 8 sets the interface conference matrix to cross-convert from the transmit unit's 20 of FIG. 8 encoded speech-frame type to the receive unit A's 22 of FIG. 8 encoded speech frame type and the process continues to step 158.

In step 158, the transmit switch 45 of FIG. 8 transmits the data to the receive switch 51 of FIG. 8 via the data path 48 of FIG. 8 and the process continues to step 160. In step 160, the receive switch 51 of FIG. 8 transmits the data to the receive unit A 22 of FIG. 8. Once the process has finished sending the data in step 160, the process ends in step 162.

Figure 11:
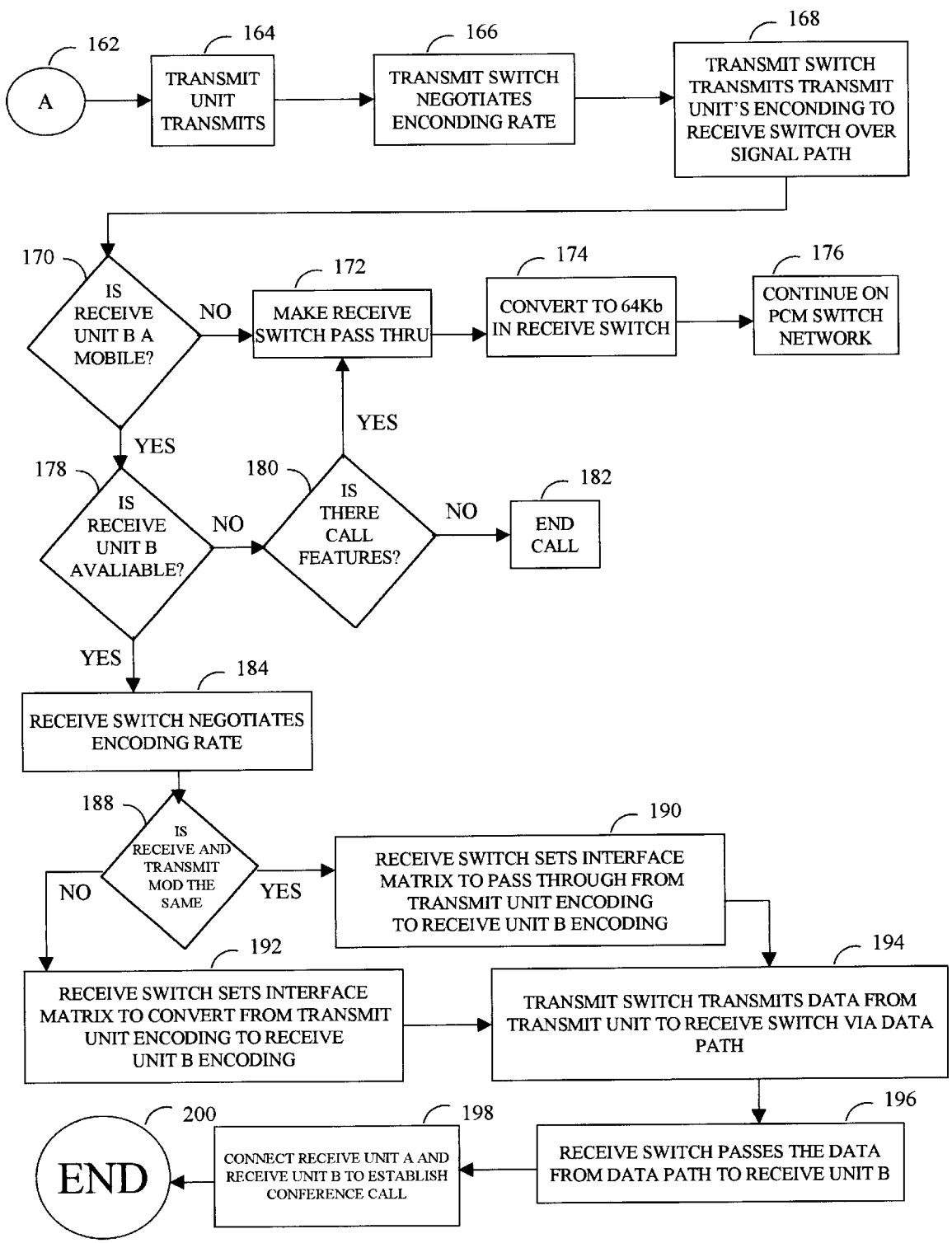
FIG. 11 is another part of the composite logic flow chart that the preferred process steps preformed by the system of FIG. 7.

In FIG. 11, a composite logic flow chart shows the preferred process steps preformed by the system of FIG. 7 in a conference call. The conference call process starts at flow point 162 as a continuation of FIG. 10. Once the transmit unit 20 of FIG. 8 attempts a conference call in step 146 of FIG. 10, the process continues to step 164. In step 164, the transmit unit 20 of FIG. 8 transmits an input data signal 26. The transmit switch 45 of FIG. 8 negotiates the encoding rate of the input signal 26 of FIG. 8 in step 166. In step 168, the transmit switch 45 of FIG. 8 transmits the transmit unit's 20 encoding speech-frame type via the signal path 56 of FIG. 8 to the receive switch 51 of FIG. 8.

The process then determines if the receive unit B 32 of FIG. 8 is a mobile unit in decision step 170. If the receive unit B 32 of FIG. 8 is not a mobile unit the process recognizes that it will be communicating with a land-line telephone and sets the receive conference interface circuit 72 of FIG. 8 to the pass through mode in step 172 and continues to step 174. In step 174, the transmit conference interface circuit 70 cross-converts the transmit unit's 20 encoded speech-frame type to 64 kb PCM. In step 176, the transmit switch 45 sends the information to the private switched telephone network 34 of FIG. 2.

If the receive unit B 32 is a mobile unit in decision step 170, the process instead continues to decision step 178. In decision step 178, the process determines if the receive unit B 32 is available. If the answer is no, the process continues to decision step 180. In decision step 180, the process checks to see if the receive unit B 32 has call features such as voice mail. If no, the process ends in step 182. If yes, the process recognizes that it will be communicating with a land-line call center and sets the receive conference interface circuit 72 of FIG. 8 to the pass through mode in step 172 and continues to step 174. In step 174, the transmit conference interface circuit 70 cross-converts the transmit unit's 20 encoded speech-frame type to 64 kb PCM. In step 176, the transmit switch 45 sends the call to a voice messaging system.

If the answer to decision step 178 is yes, the process continues instead to step 184. In step 184, the receive switch 51 of FIG. 8 determines the receive unit B's 32 of FIG. 8 encoded speech-frame type. In decision step 188, the transmit switch 45 of FIG. 8 determines whether the transmit unit's 20 of FIG. 8 encoded speech-frame type is similar to the receive unit B's 32 of FIG. 8 encoded speech-frame type. If yes, the process continues to step 190. In step 190, the receive switch 51 of FIG. 8 sets the interface conference matrix 86 of FIG. 9 to cross-connect from the transmit unit's 20 of FIG. 8 encoded speech-frame type to the receive unit B's 32 of FIG. 8 encoded speech frame type and the process continues to step 194.

If the answer to decision step 188 is no, the process instead continues to step 192. In step 192, the receive switch 51 of FIG. 8 sets the interface conference matrix 86 of FIG. 9 to cross-convert from the transmit unit's 20 of FIG. 8 encoded speech-frame type to the receive unit B's 32 of FIG. 8 encoded speech frame type and the process continues to step 194.

In step 194, the transmit switch 45 of FIG. 8 transmits the data to the receive switch 51 of FIG. 8 via the data path 48 of FIG. 8 and the process continues to step 196. In step 196, the receive switch 51 of FIG. 8 transmits the data to the receive unit B 32 of FIG. 8. The process then reconnects the original call to receive unit A 22 of FIG. 8 and establishes a conference call between transmit unit 20, receive unit A 22 and receive unit B 32 in step 198. Once the process has finished sending the data in step 198, the process ends in step 200.

Please note that while the specification in this invention is described in relation to certain implementations or embodiments, many details are set forth for the purpose of illustration. Thus, the foregoing merely illustrates the principles of the invention. For example, this invention may have other specific forms without departing from its spirit or essential characteristics. The described arrangements are illustrative and not restrictive. To those skilled in the art, the invention is susceptible to additional implementations or embodiments and certain of the details described in this application can be varied considerably without departing from the basic principles of the invention. It will thus be appreciated that those skilled in the art will be able to devise various arrangements which, although not explicitly described or shown herein, embody the principles of the invention and are thus within its spirit and scope. The scope of the invention is indicated by the attached claims.

What is claimed is:

1. A mobile telephonic communication system, comprising:
    a transmitting unit for transmitting an input signal corresponding to an input modulation type;
    a plurality of receiving units for receiving a plurality of output signals each corresponding to a plurality of output modulation types; and
    a direct interface system directly interfacing the input signal to each of the output signals.

2. The system as recited in claim 1, wherein the mobile telephonic communication system is a cellular communication system.

3. The system as recited in claim 1, wherein the modulation types are code division multiple access.

4. The system as recited in claim 1, wherein the modulation types are time division multiple access.

5. The system as recited in claim 1, wherein the modulation types are global standard for mobile communications.

6. The system as recited in claim 1, wherein the direct interface system directly interfaces a radio frequency input signal to a plurality of radio frequency output signals.

7. The system as recited in claim 6, wherein the mobile telephonic communication system is a cellular communication system.

8. The system as recited in claim 6, wherein the modulation types are code division multiple access.

9. The system as recited in claim 6, wherein the modulation types are time division multiple access.

10. The system as recited in claim 6, wherein the modulation types are global standard for mobile communications.

11. The system as recited in claim 6, wherein the direct interface system directly interfaces the radio frequency input signal to the plurality of radio frequency output signals with no more than one modulation conversion.

12. The system as recited in claim 11, wherein the mobile telephonic communication system is a cellular communication system.

13. The system as recited in claim 11, wherein the modulation types are code division multiple access.

14. The system as recited in claim 11, wherein the modulation types are time division multiple access.

15. The system as recited in claim 11, wherein the modulation types are global standard for mobile communications.

16. The system as recited in claim 1, wherein the direct interface system directly interfaces the input signal to the plurality of output signals with no more than one modulation conversion.

17. The system as recited in claim 16, wherein the mobile telephonic communication system is a cellular communication system.

18. The system as recited in claim 16, wherein the modulation types are code division multiple access.

19. The system as recited in claim 16, wherein the modulation types are time division multiple access.

20. The system as recited in claim 16, wherein the modulation types are global standard for mobile communications.

21. The system as recited in claim 1, wherein the direct interface system further includes:
    a transmit conference interface circuit directly interfacing the input signal to a data path signal; and
    a receive conference interface circuit directly interfacing the data path signal to the plurality of output signals.

22. The system as recited in claim 21, wherein the mobile telephonic communication system is a cellular communication system.

23. The system as recited in claim 21, wherein the modulation types are code division multiple access.

24. The system as recited in claim 21, wherein the modulation types are time division multiple access.

25. The system as recited in claim 21, wherein the modulation types are global standard for mobile communications.

26. The system as recited in claim 21, wherein the transmit conference interface circuit further includes:
    a plurality of input modulation types, one of which represents the modulation type corresponding to the input signal;
    a plurality of output modulation types, one of which represents the modulation type corresponding to the data path signal; and
    an interface matrix which directly interfaces the modulation type corresponding to the data path signal to the modulation type corresponding to the input signal.

27. The system as recited in claim 26, wherein the interface matrix directly interfaces the input signal to the data path signal with no more than one modulation conversion.

28. The system as recited in claim 27, wherein the mobile telephonic communication system is a cellular communication system.

29. The system as recited in claim 27, wherein the modulation types are code division multiple access.

30. The system as recited in claim 27, wherein the modulation types are time division multiple access.

31. The system as recited in claim 27, wherein the modulation types are global standard for mobile communications.

32. The system as recited in claim 26, wherein the interface matrix directly interfaces a radio frequency input signal to a radio frequency data path signal.

33. The system as recited in claim 32, wherein the mobile telephonic communication system is a cellular communication system.

34. The system as recited in claim 32, wherein the modulation types are code division multiple access.

35. The system as recited in claim 32, wherein the modulation types are time division multiple access.

36. The system as recited in claim 32, wherein the modulation types are global standard for mobile communications.

37. The system as recited in claim 21, wherein the receive conference interface circuit further includes:
- a plurality of input modulation types, one of which represents the modulation type corresponding to one of the plurality of output signals;
- a plurality of output modulation types, one of which represents the modulation type corresponding a data path signal; and
- an interface matrix which directly interfaces the modulation type corresponding to the data path signal to the modulation type corresponding to one of the plurality of output signals.

38. The system as recited in claim 37, wherein the interface matrix directly interfaces the input signal to the data path signal with no more than one modulation conversion.

39. The system as recited in claim 37, wherein the mobile telephonic communication system is a cellular communication system.

40. The system as recited in claim 38, wherein the modulation types are code division multiple access.

41. The system as recited in claim 38, wherein the modulation types are time division multiple access.

42. The system as recited in claim 38, wherein the modulation types are global standard for mobile communications.

43. The system as recited in claim 37, wherein the interface matrix directly interfaces a radio frequency input signal to a radio frequency data path signal.

44. The system as recited in claim 43, wherein the mobile telephonic communication system is a cellular communication system.

45. The system as recited in claim 43, wherein the modulation types are code division multiple access.

46. The system as recited in claim 43, wherein the modulation types are time division multiple access.

47. The system as recited in claim 43, wherein the modulation types are global standard for mobile communications.

48. The system as recited in claim 21, wherein the transmit conference interface circuit further includes:
- a plurality of transmit input modulation types, one of which represents the modulation type corresponding to the input signal;
- a plurality of transmit output modulation types, one of which represents the modulation type corresponding a data path signal;
- a transmit interface matrix which directly interfaces the modulation type corresponding to the data path signal to the modulation type corresponding to the input signal;
- a plurality of receiving input modulation types, one of which represents the modulation type corresponding to one of the plurality of output signals;
- a plurality of receiving output modulation types, one of which represents the modulation type corresponding a data path signal; and
- a receiving interface matrix which directly interfaces the modulation type corresponding to the data path signal to the modulation type corresponding to the one of the plurality of output signals.

49. The system as recited in claim 48, wherein the transmit interface matrix directly interfaces the input signal to the data path signal with no more than one modulation conversion and the receive interface matrix directly interfaces the data path signal to the one of the plurality of output signals with no modulation conversion.

50. The system as recited in claim 49, wherein the mobile telephonic communication system is a cellular communication system.

51. The system as recited in claim 49, wherein the modulation types are code division multiple access.

52. The system as recited in claim 49, wherein the modulation types are time division multiple access.

53. The system as recited in claim 49, wherein the modulation types are global standard for mobile communications.

54. The system as recited in claim 48, wherein the transmit interface matrix directly interfaces a radio frequency input signal to a radio frequency data path signal with no more than one modulation conversion and the receive interface matrix directly interfaces a radio frequency data path signal to one of a plurality of radio frequency output signals with no modulation conversion.

55. The system as recited in claim 54, wherein the mobile telephonic communication system is a cellular communication system.

56. The system as recited in claim 54, wherein the modulation types are code division multiple access.

57. The system as recited in claim 54, wherein the modulation types are time division multiple access.

58. The system as recited in claim 54, wherein the modulation types are global standard for mobile communications.

59. The system as recited in claim 1, wherein the direct interface system further includes:
- a switch; and
- an interface circuit directly interfacing the input signal to one of a plurality of output signals within the switch.

60. The system as recited in claim 59, wherein the interface circuit further includes:
- a plurality of input modulation types, one of which represents the modulation type corresponding to the input signal;
- a plurality of output modulation types, one of which represents the modulation type corresponding the one of the plurality of output signals; and
- an interface matrix which directly interfaces the modulation type corresponding to the one of the plurality of output signal to the modulation type corresponding to the input signal.

61. The system as recited in claim 60, wherein the mobile telephonic communication system is a cellular communication system.

62. The system as recited in claim 60, wherein the modulation types are code division multiple access.

63. The system as recited in claim 60, wherein the modulation types are time division multiple access.

64. The system as recited in claim 60, wherein the modulation types are global standard for mobile communications.

65. The system as recited in claim 60, wherein the interface matrix directly interfaces the input signal to the one of the plurality of output signals with no more than one modulation conversion.

66. The system as recited in claim 65, wherein the mobile telephonic communication system is a cellular communication system.

67. The system as recited in claim 65, wherein the modulation types are code division multiple access.

68. The system as recited in claim 65, wherein the modulation types are time division multiple access.

69. The system as recited in claim 65, wherein the modulation types are global standard for mobile communications.

70. The system as recited in claim 60, wherein the interface matrix directly interfaces a radio frequency input signal to one of a plurality of radio frequency output signals.

71. The system as recited in claim 70, wherein the mobile telephonic communication system is a cellular communication system.

72. The system as recited in claim 70, wherein the modulation types are code division multiple access.

73. The system as recited in claim 70, wherein the modulation types are time division multiple access.

74. The system as recited in claim 70, wherein the modulation types are global standard for mobile communications.

75. A system for routing data from a transmit unit to a plurality of receive units, comprising
   a plurality of input modulation types, one of which represents the modulation type of the input signal from the transmit unit;
   a plurality of output modulation types, one or which represents the modulation type of the data to one of the plurality of receive units; and
   an interface matrix which selects one output modulation type corresponding to the modulation type of the input signal from the transmit unit;
   wherein the interface matrix directly interfaces the one output modulation type to the modulation type of the input signal with no more than one modulation conversion.

76. The system as recited in claim 75, wherein the mobile telephonic communication system is a cellular communication system.

77. The system as recited in claim 75, wherein the modulation types are code division multiple access.

78. The system as recited in claim 75, wherein the modulation types are time division multiple access.

79. The system as recited in claim 75, wherein the modulation types are global standard for mobile communications.

80. The system as recited in claim 75, wherein the mobile telephonic communication system is a cellular communication system.

81. The system as recited in claim 75, wherein the modulation types are code division multiple access.

82. The system as recited in claim 75, wherein the modulation types are time division multiple access.

83. The system as recited in claim 75, wherein the modulation types are global standard for mobile communications.

84. The system as recited in claim 75, wherein the interface matrix directly interfaces an input radio frequency modulation type to one of a plurality of radio frequency modulation type of the output signals.

85. The system as recited in claim 84, wherein the mobile telephonic communication system is a cellular communication system.

86. The system as recited in claim 84, wherein the modulation types are code division multiple access.

87. The system as recited in claim 84, wherein the modulation types are time division multiple access.

88. The system as recited in claim 84, wherein the modulation types are global standard for mobile communications.

89. A mobile telephone communication system, comprising:
   a plurality of mobile telephones each operating in accordance with one of a plurality of different modulation schemes; and
   means for selectively, directly interfacing input signals received from one of the plurality of mobile telephones having one of the plurality of different modulating types directly to the corresponding output signals of another one of the plurality of modulation types prior to transmitting the corresponding output signals to the other mobile telephone.

90. The system as recited in claim 89, wherein the modulation schemes are of a code division multiple access type.

91. The system as recited in claim 89, wherein the modulation schemes are of a time division multiple access type.

92. The system as recited in claim 89, wherein the modulation types are global standard for mobile communications.

93. A mobile telephonic communication method, comprising the steps of:
   operating one of a plurality of mobile telephones in accordance with one of a plurality of different modulation schemes; and
   selectively, directly interfacing input signals received from the one of the plurality of mobile telephones having one of the plurality of different modulating schemes directly to corresponding output signals of another one of the plurality of modulation schemes; and
   transmitting the corresponding output signals to the other one of the plurality of telephones after the step of interfacing.

94. A method for mobile telephonic communication, comprising:
   transmitting an input signal, corresponding to an input modulation type, for a transmitting unit;
   receiving a plurality of output signals, each corresponding to a plurality of output modulation types, at a plurality of receiving units; and
   directly interfacing the input signal to each of the output signals.

95. The method as recited in claim 94, wherein the modulation types are code division multiple access.

96. The method as recited in claim 94, wherein the modulation types are time division multiple access.

97. The method as recited in claim 94, wherein the modulation types are global standard for mobile communications.

98. The method as recited in claim 94, wherein the input and output signals are radio frequency signals.

99. The method as recited in claim 94, wherein the step of directly interfacing the input signal to each of the output signals is performed with only one modulation conversion.

100. The method as recited in claim 95, wherein the step of directly interfacing the input signal to each of the output signals further comprises the steps of:
   directly interfacing the input signal to a data path signal through a transmit conference interface circuit; and
   directly interfacing the data path signal to the plurality of output signals through a receive conference interface circuit.

101. The method as recited in claim 100, wherein the step of directly interfacing the input signal to a data path signal through a transmit conference interface circuit further comprises the steps of:

selecting a plurality of input modulation types, one of which represents the modulation type corresponding to the input signal;

selecting a plurality of output modulation types, one of which represents the modulation type corresponding to the data path signal; and directly interfacing the modulation type corresponding to the data path signal to the modulation type corresponding to the input signal through a interface matrix.

102. The method as recited in claim 101, wherein the step of directly interfacing the modulation type corresponding to the data path signal to the modulation type corresponding to the input signal through a interface matrix involves a maximum of one modulation conversion.

103. The method as recited in claim 100, wherein the step of directly interfacing the data path signal to the plurality of output signals through a receive conference interface circuit further comprises the steps of:

selecting a plurality of input modulation types, one of which represents the modulation type corresponding to one of the plurality of output signals;

selecting a plurality of output modulation types, one of which represents the modulation type corresponding to the data path signal; and directly interfacing the modulation type corresponding to the data path signal to the modulation type corresponding to one of the plurality of output signals through a interface matrix.

104. The method as recited in claim 103, wherein the step of directly interfacing the modulation type corresponding to the data path signal to the modulation type corresponding to one of the plurality of output signals through a interface matrix involves a maximum of one modulation conversion.

\* \* \* \* \*